March 7, 1950         L. F. SAMLER         2,499,421
POLYETHYLENE TAPE EXTRUSION Filed March 11, 1946         2 Sheets-Sheet 2

Inventor
Lee P. Samler,
By Karl W. Flocks
Attorney

Patented Mar. 7, 1950

2,499,421

UNITED STATES PATENT OFFICE 2,499,421

POLYETHYLENE TAPE EXTRUSION

Lee F. Samler, Baltimore, Md., assignor to The National Plastic Products Company, Odenton, Md., a corporation of Maryland Application March 11, 1946, Serial No. 653,551

9 Claims. (Cl. 18—55)

This invention relates to the production of extruded thermoplastic tape and more particularly to the production of such tape by an extrusion process which will serve to insure uniform cross-sectional thickness and which will maintain the physical and electrical properties of the plastic.

Prior to the instant invention, thermoplastic tapes have been extruded in the conventional manner through a die and onto a moving belt. In practice, when the thickness of the tape is in excess of .025" it has been found that it is difficult to control the flow conditions in the die and if the exit velocities across the die are not accurately controlled inherent stresses will be set up within the material which will ultimately be reflected by distortion and/or shrinkage in the finished product. Attempts have also been made to extrude tapes of several times the desired thickness which were then passed through cold rollers until the length of the tape was increased to several times the original length; however, it is well known that internal stresses are induced in this cold rolling or calendering process which will be ultimately reflected by distortion and/or shrinkage. Elevated temperatures in the die may improve flow conditions therethrough somewhat, but elevated temperatures applied for a predetermined time to certain thermoplastics, such as polyethylene for example, will result in the degradation of the electrical properties of this material which is of great importance when, for example, the polyethylene tape is to be used in the manufacture of insulating elements which are to form a part of electrical cables which are to have very low attenuation losses as with low attenuation losses the number of amplification stages required in a high frequency transmission line may be kept at a minimum.

It is an object of the instant invention to teach the production of continuous lengths of substantially stress free thermoplastic tape of substantially uniform cross-sectional thickness.

It is another object of the instant invention to teach the production of continuous lengths of substantially stress free polyethylene tape of substantially uniform cross-sectional thickness.

It is another object of the instant invention to teach the production of continuous lengths of thermoplastic tape at relatively low temperatures.

Another object of the instant invention is to teach the production of continuous lengths of polyethylene tape at relatively low temperatures.

It is a further object of the instant invention to produce a substantially stress free polyethylene tape of substantially uniform cross-sectional thickness of undegraded electrical properties.

Other objects and the nature and advantages of the instant invention will be apparent from the following description taken in conjunction with the accompanying drawings, wherein.

Figure 1:
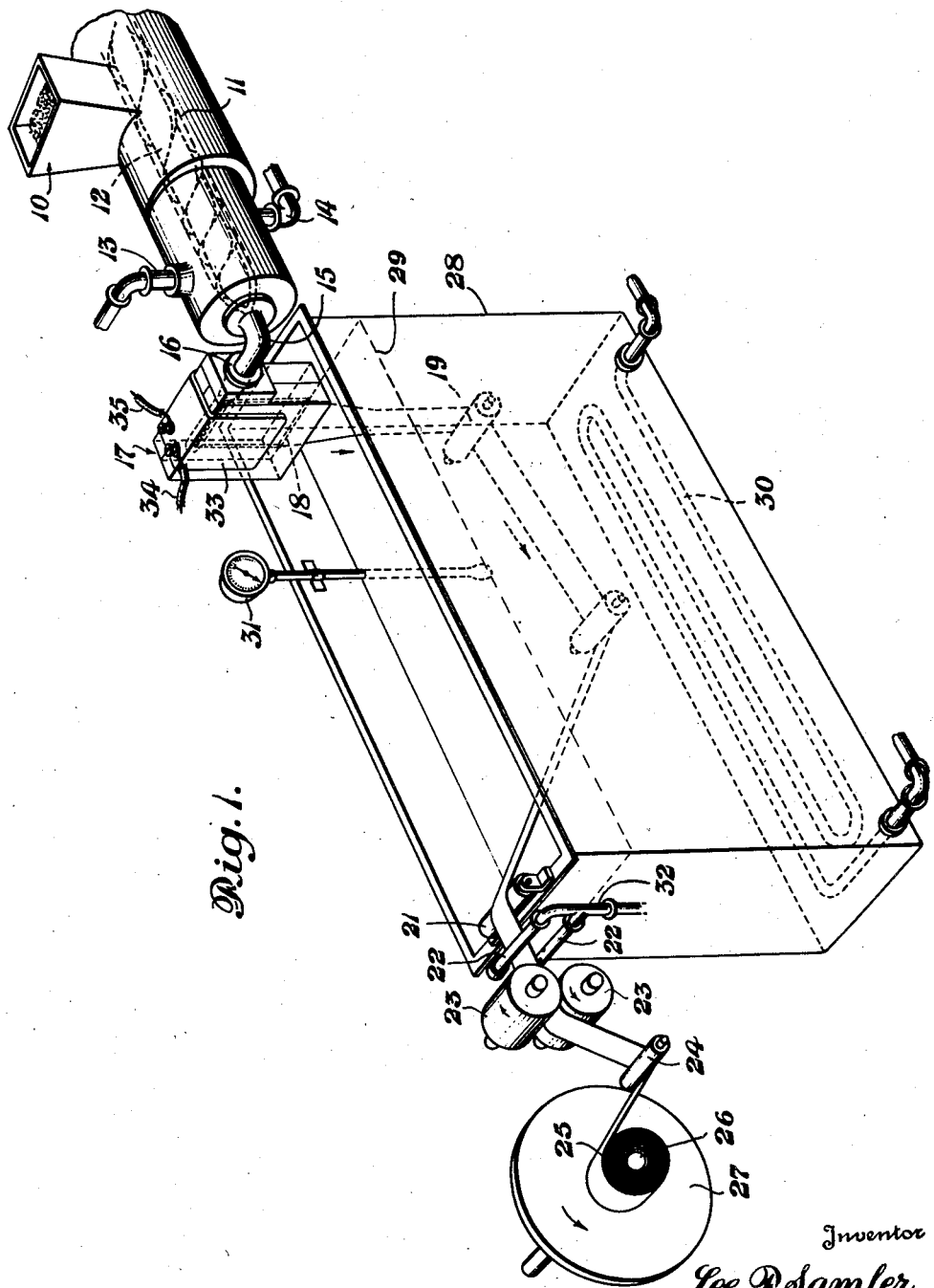
Figure 1 is a schematic view in perspective of an apparatus for carrying out the invention.
Figure 2:
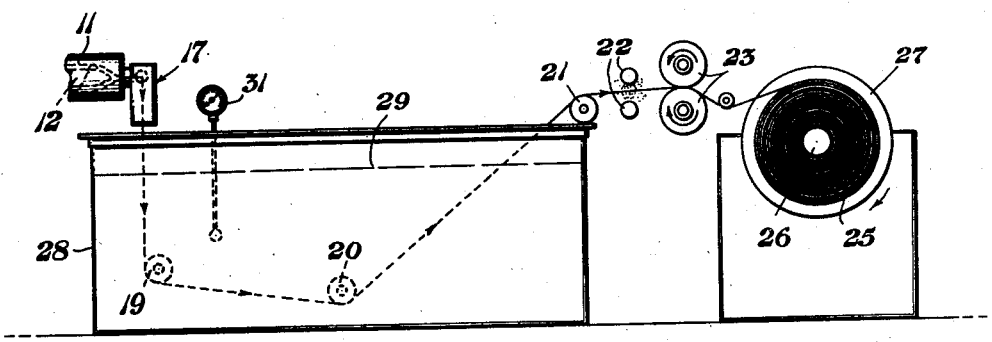
Fig. 2 is a schematic view in side elevation of the apparatus shown in Figure 1.

Referring to Figures 1 and 2, the thermoplastic compound in either powder, pellet, or other convenient form is introduced into the top of the feed hopper 10 which is associated with the extrusion cylinder 11 within which is located the extrusion screw 12. The extrusion cylinder 11 may be heated in the conventional manner and in the drawings the extrusion cylinder 11 is jacketed so that the cylinder may be heated by steam, and the pipes 13 and 14 are part of the steam heating system for heating the cylinder 11. The extrusion screw 12 forces the melted plastic compound through the conduit 15 which confines the melted plastic to a path which changes the direction of flow from that which is coaxial with the axis of the screw to a direction which is at right angles to the axis of the screw and in the same horizontal plane. The conduit 15 is connected at its outlet end 16 with the die assembly 17.

The plastic compound in the form of tape leaves the bottom 18 of the die assembly 17 and in a direction which is aligned with the land of the die and passes under the roller 19 and moves on toward a position under the roller 20 and then upwardly and forwardly to a position where it passes over the guide roll 21 and then horizontally and between the washing headers 22 from whence the tape passes between the take-off or pulling rolls 23 which turn in opposite directions in the direction of the arrows. The tape then passes under the guide roll 24 and is then wound up in the form of a coil 25 on the spindle 26 of the reel 27.

The rollers 19 and 20 are journalled for rotation within the tank 28 which may contain a tempering liquid, such as water 29, which tempering liquid may be heated by the steam coils 30 located within the tank 28. The thermometer 31 registers the temperature of the tempering liquid 29 and may be associated with a control for regulating the temperature of the tempering liquid by controlling the flow of steam through the steam coils 30. The location of the roll 20 may be lower than the location of the roll 19 so that the portion of the tape between the exit of the die and the roll 19 will make an angle of more than 90° with a portion of the tape between the roll 19 and the roll 20.

The headers 22 are provided with a series of orifices along the surfaces adjacent the top and bottom of the extruded tape, which passes between the headers 22 so that as washing fluid, which is fed to the manifold 32, passes through the headers 22 it will be directed through said orifices and on to the top and bottom surfaces of the extruded tape which passes between the headers 22 to wash same and remove any foreign particles which may be picked up in the tempering bath or from the atmosphere. Except when plastic compound is being fed to the hopper 10, the hopper may be covered so as to prevent the entrance of any foreign material into the extrusion cylinder 11.

The die 17 may be heated by the electric heater 33 which is served with electric current by the electric conduits 34 and 35.

Figure 3:
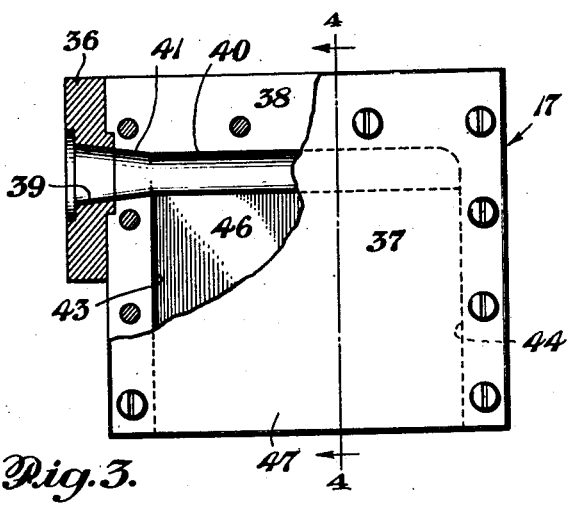
Fig. 3 is a front elevation with parts broken away and parts shown in section of an extruder die useful in carrying out the invention.
Figure 4:
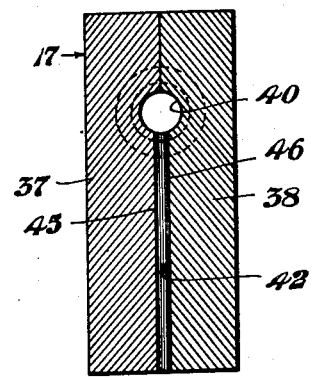
Fig. 4 is a vertical sectional view taken along line 4—4 of Fig. 3 and looking in the direction of the arrows.
Figure 5:
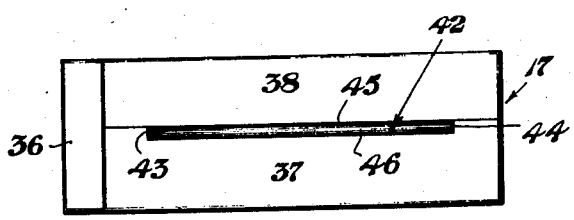
Fig. 5 is a bottom view of the die shown in Figure 3.

Referring to Figures 3, 4 and 5, the die 17 may be made of steel and of three parts comprising an inlet adaptor 36, and two major block-like elements 37 and 38, respectively. The adaptor 36 is formed with a tapered opening 39 extending therethrough which is adapted to be associated with the outlet end 16 of the conduit 15. A tubular manifold 40 of relatively large diameter is formed within the die by block-like elements 37 and 38, and the inlet portion 41 thereof is adapted to be associated with the passage 39 extending through the adaptor 36. The manifold 40 is adapted to extend horizontally and when in position has its axis at right angles to the axis of the screw 12. Formed within the die block-like elements 37 and 38 is the die land 42 having long narrow sides 43 and 44 and long wide faces 45 and 46.

One of the significant elements cooperating in the production of a stress free thermoplastic tape of uniform cross section is the length of the effective die land which, in the case of the die 17, is the vertical distance from the tubular manifold 40 to the bottom 47. This effective length of the die land should be at least twenty-five times the thickness of the tape to be produced, and in the production of polyethylene tape fifty times the thickness of the tape has been found to be preferred. In the production of thermoplastic tapes, shorter die lands serve to produce a non-uniform exit velocity across the width of the die; that is from the narrow side 43 to the narrow side 44 at the bottom 47 and a tape produced through the use of such a die has inherent stresses therein. If the axis of the die were in line with the axis of the extruder screw, the tendency of the plastic material leaving the die is to have a greater velocity in the center; that is, midway between the narrow sides 43 and 44, and a lesser velocity adjacent the narrow sides 43 and 44. However, in the case of thick cross sections, such as tapes of a thickness of .025" or greater, even with the axis of the die at right angles to the axis of the screw, and even with the die arranged as shown in the drawings, unless the length of the effective land of the die is as described, the exit velocity of the material being extruded will be greater along the side 43 than along the side 44 so that the section of material passing through the die would be generally wedge-shaped instead of rectangular in shape. The long land described insures the proper cross sectional shape of the tape.

In the production of polyethylene tape, the exposure of the material to high temperatures over a period of time requires critical control if electrical properties thereof are not to be degraded. Though flow conditions of the material through the apparatus may be improved by increasing the temperature of the material at the die and in the cylinder, the electrical properties naturally inherent in the material will be degraded as it is subjected to high temperatures over a period of time. The extrusion process inherently requires a given period of time in its operation and, accordingly, in the production of polyethylene tape of the character which is to have its natural electrical properties undegraded by thermal abuse, the highest temperatures in the system are to be maintained as low as possible. It has been found in operation of the process described that temperatures in the cylinder of approximately 360° F. and die temperatures of 350° F. may be maintained for polyethylene tape thicknesses within the range of .070" to .085". The contour of the passage leading from the cylinder to the exit of the die should be so designed as to prevent stagnation of the material as such stagnation would cause possible degradation by exposure to heat-time factor of degrading character. Accordingly, the passage leading from the cylinder to the manifold 40 is of large cross section of smooth profile and the manifold 40 is of large cross section and smooth profile as compared with the distance between the face 45 and face 46 of the die land 42.

In the extrusion process, the take-up rolls 23 travel at such a rate as to correspond to a higher lineal velocity of the tape at this point in the process than the lineal velocity of the tape leaving the exit of the die 17. This difference in velocity serves to effect a pull-down or diminishing of the thickness of the tape so that the finished thickness of tape will be less than the distance between the faces 45 and 46 of the die 17 at the bottom 47. This pull-down occurs between the bottom of the die and the point where the tape enters the tempering bath wherein the tape is cooled so that the amount of pull-down or hot stretch can be controlled by varying the fluid level within the tempering bath or varying the speed of the take-up rolls 23. In the process described, the rollers 19 and 20 have their surfaces traveling at the same speed as the surfaces of the rollers 23. The roll 19 is so located within the tank 28 and below the die 17 that the axial travel of the tape, while it is being pulled down and at least partially tempered or cooled, is aligned with the axis of the die land 42. In the process, the amount of pull-down should be near the minimum required for proper control of movement of the tape through the travel recited and a pull-down within the range of 25% to 30% under the conditions herein referred to has been found to be satisfactory.

The temperature of the bath 29 may range from between 115° to 140° F. In general, the highest temperature of the tempering bath which will effect the solidification of the material in a given travel in such a manner that it can be practically taken up by the take-up rolls and passed to the reeling apparatus is best.

The tape immediately after it has received its hot stretch or pull-down and then partially tempered or cooled, should not be subjected to any sharp bend as to do so may cause the setting up of stresses therewithin. In accordance with the process described, it has been found satisfactory to make the angle between that portion of the tape extending from the bottom of the die to the roller 19 and that portion of the tape between the roller 19 and the roller 20 more than 90°. It may be possible to accomplish the same purpose by making the roller 19 of very large diameter. The angle between the portion of the tape extending between the roller 19 and the roller 20 and that portion of the tape between the roller 20 and the take-up apparatus may also be more than 90° so that no sharp bends occur between the roller 19 and the take-up apparatus.

If a piece of tape were cut out from the extruded material right after it passed the roller 19, it would not be free from stress, and strain would be evidenced under accelerated heat tests.

The roller 19 is located below the level of tempering fluid a sufficient distance so that a partial tempering or cooling of the tape is effected after it has received its pull-down or hot stretch above the level of the fluid and this partial tempering or cooling of the tape occurs while it is traveling in a direction which is aligned with the axis of die land. If the roller 19 were too close to the surface level of tempering fluid so that this partial tempering or cooling of the tape could not be effected while the axis of tape is aligned with the axis of the die land, the finished tape at the reel would not have the characteristic of being stress-free. If the temperature of the tempering bath 29 is too high, the take-up apparatus would be imparting stress to the tape. If the temperature of the tempering bath 29 is too low, the chilling effect on the material will impart stress to the tape.

The temperatures given above relate to the temperatures used in the process of manufacturing polyethylene tape from polyethylene having a plastometer value of between 48 and 55 as measured on a Williams plastometer.

It will be obvious to those skilled in the art that various changes may be made without departing from the spirit of the invention and therefore the invention is not limited to what is shown in the drawings and described in the specification but only as indicated in the appended claims.

I claim:

1. The method of producing extruded polyethylene tape of uniform cross-sectional thickness of .025" or thicker with the electrical characteristics of the polyethylene maintained, comprising melting the polyethylene while preventing exposure to temperatures deleteriously affecting the electrical properties thereof, forcing the melted polyethylene as it is melted to flow in a predetermined direction, then flowing the melted polyethylene through a tortuous passage of relatively large cross-section area as compared to a subsequent die land, then flowing the melted polyethylene through said die land, said land having a length at least twenty-five times the thickness of said tape and an exit orifice of a width greater than the thickness of the finished tape to be produced, heating said die land to approximately the temperature of the molten polyethylene, pulling the tape from said exit orifice in the same direction as its flow through the die land, whereby the thickness of the tape as it is pulled will be diminished, passing the tape while being pulled in the same direction into a liquid tempering medium, the surface of said liquid being at right angles to the tape entering the same and the temperature of the liquid tempering medium being maintained at a temperature near the highest temperature which will effect the solidification of the polyethylene to a degree necessary for the handling of the same, so that said tape will be set after it has been hot stretched, thereafter moving the tape through said tempering medium while avoiding changes in direction of less than 90°, and winding the finished polyethylene tape on a reel.

2. The method recited in claim 1, wherein said flow through said tortuous passage comprises flow at right angles to said flow in said predetermined direction.

3. The method recited in claim 1, wherein said flow through said tortuous passage comprises flow at right angles to said flow in said predetermined direction in one plane, and the direction of flow through said heated die land being at right angles to said flow in said predetermined direction in a second plane which is at right angles to said first plane.

4. The method recited in claim 1, wherein the material is caused to flow through the die land for a distance of approximately fifty times the thickness of the finished tape.

5. The method of producing polyethylene tape in accordance with claim 1, whereby the pulling of the tape from the exit of the die reduces the thickness of the extrusion by an amount not more than 25% to 30%.

6. The method recited in claim 1, and washing the tape prior to the winding step.

7. The method recited in claim 1, wherein said polyethylene has a plastometer value within the range of 48 to 55 as measured on a Williams plastometer and wherein said tempering medium is maintained within the range of 115° F. to 140° F.

8. The method recited in claim 1, wherein said polyethylene has a plastometer value within the range of 48 to 55 as measured on a Williams plastometer and wherein the melting of the polyethylene is effected at temperatures of 360° F. or less.

9. The method recited in claim 1, wherein said polyethylene has a plastometer value within the range of 48 to 55 as measured on a Williams plastometer and wherein the die land is heated to a temperature of approximately 350° F.

LEE F. SAMLER.

REFERENCES CITED

The following references are of record in the file of this patent:

UNITED STATES PATENTS

| Number | Name | Date |
| --- | --- | --- |
| 2,174,779 | Delorme | Oct. 3, 1939 |
| 2,177,658 | Kimble et al. | Oct. 31, 1939 |
| 2,212,770 | Foster | Aug. 27, 1940 |
| 2,219,700 | Perrin et al. | Oct. 29, 1940 |
| 2,242,364 | Montanale | May 20, 1941 |
| 2,261,977 | Deutsch | Nov. 11, 1941 |
| 2,320,115 | Young | May 25, 1943 |
| 2,365,374 | Bailey | Dec. 19, 1944 |